US012621716B2

(12) United States Patent
Ge et al.

(10) Patent No.: US 12,621,716 B2
(45) Date of Patent: May 5, 2026

(54) DATA OFFLOAD METHOD AND DEVICE

(71) Applicants: CHINA MOBILE GROUP DESIGN INSTITUTE CO., LTD., Beijing (CN); CHINA MOBILE COMMUNICATIONS GROUP CO., LTD., Beijing (CN)

(72) Inventors: Jian Ge, Beijing (CN); Chengyao Zhang, Beijiing (CN); Hao Wang, Beijing (CN); Dekun Kong, Beijing (CN); Xinwei Che, Beijing (CN)

(73) Assignees: CHINA MOBILE GROUP DESIGN INSTITUTE CO., LTD., Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 301 days.

(21) Appl. No.: 18/693,716

(22) PCT Filed: Jan. 6, 2023

(86) PCT No.: PCT/CN2023/071018
§ 371 (c)(1),
(2) Date: Mar. 20, 2024

(87) PCT Pub. No.: WO2024/060472
PCT Pub. Date: Mar. 28, 2024

(65) Prior Publication Data
US 2026/0122537 A1      Apr. 30, 2026

(30) Foreign Application Priority Data
Sep. 20, 2022      (CN) .......................... 202211141930.X

(51) Int. Cl.
*H04W 28/00*          (2009.01)
*H04W 28/08*          (2023.01)
(Continued)

(52) U.S. Cl.
CPC ... *H04W 28/0925* (2020.05); *H04W 28/0846* (2020.05); *H04W 76/10* (2018.02); *H04W 84/10* (2013.01)

(58) Field of Classification Search
CPC ............. H04W 28/0925; H04W 76/10; H04W 28/0846; H04W 84/10
(Continued)

(56) References Cited

U.S. PATENT DOCUMENTS

2022/0007180 A1      1/2022  Liao et al.
2023/0422016 A1*   12/2023  Ma ........................ H04W 76/12
(Continued)

FOREIGN PATENT DOCUMENTS

CN        110048873 A      7/2019
CN        110351777 A      10/2019
(Continued)

OTHER PUBLICATIONS

3GPP, "3rd Generation Partnership Project; Technical Specification Group Services and System Aspects; System architecture for the 5G System (5GS); Stage 2 (Release 17)", 3GPP TS 23.501, V17.5.0, Jun. 30, 2022 (8 pages).
(Continued)

*Primary Examiner* — Robert J Lopata
(74) *Attorney, Agent, or Firm* — Maginot, Moore & Beck, LLP

(57)          ABSTRACT
A data offloading method, performed by an uplink classifier (UL CL) user plane function (UPF), includes: subscribing a general data network name (DNN) and a dedicated DNN for a target user in a unified data management (UDM), configuring an offloading rule, inserting the UL CL UPF a session management function (SMF) when establishing a packet data unit (PDU) session based on the dedicated DNN, offloading data for accessing a public network in an uplink
(Continued)

data packet sent by the target user in a non-international roaming scenario a secondary anchor UPF using the UL CL UPF, and offloading data for accessing a user private network to a primary anchor UPF.

15 Claims, 6 Drawing Sheets

(51) Int. Cl.
    *H04W 76/10*         (2018.01)
    *H04W 84/10*         (2009.01)

(58) Field of Classification Search
    USPC ......................................................... 370/329
    See application file for complete search history.

(56)            References Cited

U.S. PATENT DOCUMENTS

| 2025/0386247 A1* | 12/2025 | Li .......................... H04W 16/10 |
| 2026/0019452 A1* | 1/2026 | Long ................... H04L 65/1069 |

FOREIGN PATENT DOCUMENTS

| CN | 114885332 A | 8/2022 |
| CN | 115002769 A | 9/2022 |
| CN | 115529294 A | 12/2022 |
| CN | 115529342 A | 12/2022 |

OTHER PUBLICATIONS

Written Opinion and International Search Report for corresponding application PCT/CN2023/071018, mailed Apr. 20, 2023, with English Translation (18 pages).

* cited by examiner

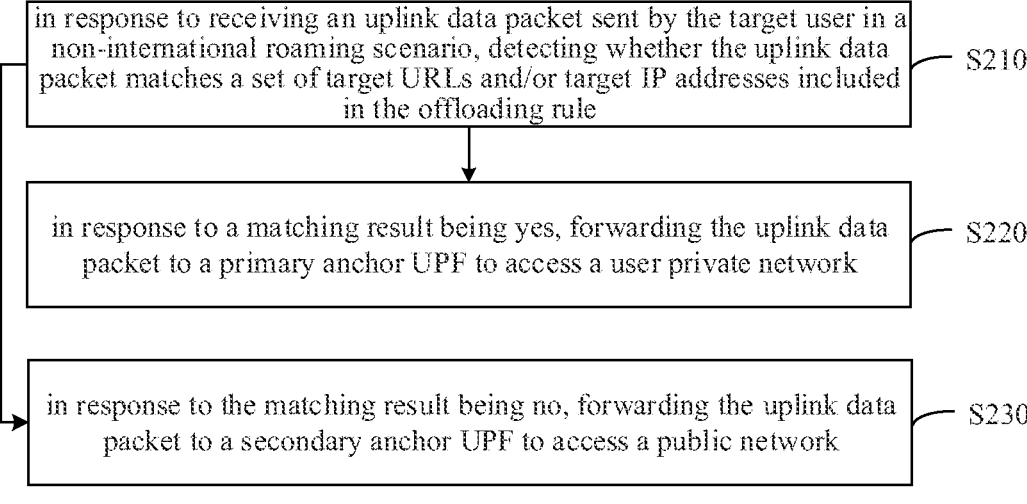

in response to receiving an uplink data packet sent by the target user in a non-international roaming scenario, detecting whether the uplink data packet matches a set of target URLs and/or target IP addresses included in the offloading rule — S210 in response to a matching result being yes, forwarding the uplink data packet to a primary anchor UPF to access a user private network — S220 in response to the matching result being no, forwarding the uplink data packet to a secondary anchor UPF to access a public network — S230

FIG. 2 receiving the offloading rule subscribed by the target user from the PCF — S310 inserting the UL CL UPF when establishing the PDU session using the dedicated DNN based on the remote offloading identifier — S320

FIG. 3A

DATA OFFLOAD METHOD AND DEVICE

CROSS REFERENCE TO RELATED APPLICATIONS

This application is a U.S. national phase application of International Application No. PCT/CN2023/071018, filed on Jan. 6, 2023, which is based on and claims priority to Chinese patent application No. 202211141930.X, filed on Sep. 20, 2022, and tilted "data offload method, dual-domain private network system, device and storage medium", the entire contents of which are incorporated herein by reference.

TECHNICAL FIELD

The disclosure relates to, but is not limited to, a field of communication technologies, more particularly, to a data offload method, a dual-domain private network system, a device, a storage medium and a program product.

BACKGROUND

The 5th generation mobile communication system (5G) dual-domain private network is one of the hotspots of 5G construction. The 5G dual-domain private network is mainly for campus, government, large enterprises and institutions and other scenarios. In such scenarios, the user generally has the demand for using a personal to-customer (2C) terminal to access an enterprise private network (to-business (2B) network) and the Internet (2C network) at the same time. Therefore, it is necessary to solve the problem of a 2C user simultaneously accessing both the 2B network and the 2C network through the 5G dual-domain private network.

SUMMARY

In a first aspect, embodiments of the disclosure provide a data offloading method, performed by an uplink classifier (UL CL) user plane function (UPF) in a dual-domain private network system. The dual-domain private network system further includes a session management function (SMF), a policy control function (PCF) for subscribing an offloading rule for a target user, a unified data management (UDM) for subscribing a dedicated data network name (DNN) and a general DNN for the target user. The method includes:

in response to receiving an uplink data packet sent by the target user in a non-international roaming scenario, detecting whether the uplink data packet matches a set of target uniform resource locators (URL) and/or destination internet protocol (IP) addresses included in the offloading rule, in which the offloading rule is configured by the SMF when the SMF inserts the UL CL UPF during establishing a packet data unit (PDU) session based on the dedicated DNN; in response to a matching result being yes, forwarding the uplink data packet to a primary anchor UPF to access a user private network, in which the primary anchor UPF is determined based on the dedicated DNN; and in response to the matching result being no, forwarding the uplink data packet to a secondary anchor UPF to access a public network, in which the secondary anchor UPF is determined based on the general DNN.

In a second aspect, embodiments of the disclosure provide a data offloading method, performed by a session management function (SMF) in a dual-domain private network system. The dual-domain private network system includes a UL CL UPF, a PCF for subscribing an offloading rule for a target user, a UDM for subscribing a dedicated DNN and a general DNN for the target user. The method includes:

receiving the offloading rule subscribed by the target user from the PCF, in which the offloading rule at least includes a remote offloading identifier, and the remote offloading identifier is configured to indicate the SMF to insert the UL CL UPF when establishing a PDU session for the target user; and inserting the UL CL UPF when establishing the PDU session using the dedicated DNN based on the remote offloading identifier.

In a third aspect, embodiments of the disclosure provide a dual-domain private network system, including: a UL CL UPF, a SMF, a PCF, and a UDM.

The UDM is configured to store subscription data of a user, in which the subscription data includes a dedicated DNN, a general DNN, and an associated target user. The PCF is configured to subscribe an offloading rule for the target user, and send the offloading rule to the SMF in response to a request from the SMF, in which the offloading rule at least includes a remote offloading identifier, and the remote offloading identifier is configured to indicate the SMF to insert the UL CL UPF when establishing a PDU session for the target user. The SMF is configured to receive the offloading rule, and insert the UL CL UPF when establishing the PDU session using the dedicated DNN based on the remote offloading identifier. The UL CL UPF is configured to offload data for accessing a public network in an uplink data packet to a secondary anchor UP and offload data for accessing a user private network to a primary anchor UPF based on the offloading rule.

It should be understood that the above general and detailed descriptions are exemplary and explanatory only and are not intended to limit the technical solutions of the disclosure.

BRIEF DESCRIPTION OF THE DRAWINGS

The accompanying drawings herein are incorporated in and form a part of the specification, which illustrate embodiments consistent with the disclosure and are used in combination with the specification to illustrate the technical embodiments of the disclosure.

FIG. 2 is an optional flowchart of a data offloading method provided by an embodiment of the disclosure.

FIG. 3A is an optional flowchart of a data offloading method provided by an embodiment of the disclosure.

DETAILED DESCRIPTION

Figure 1A:
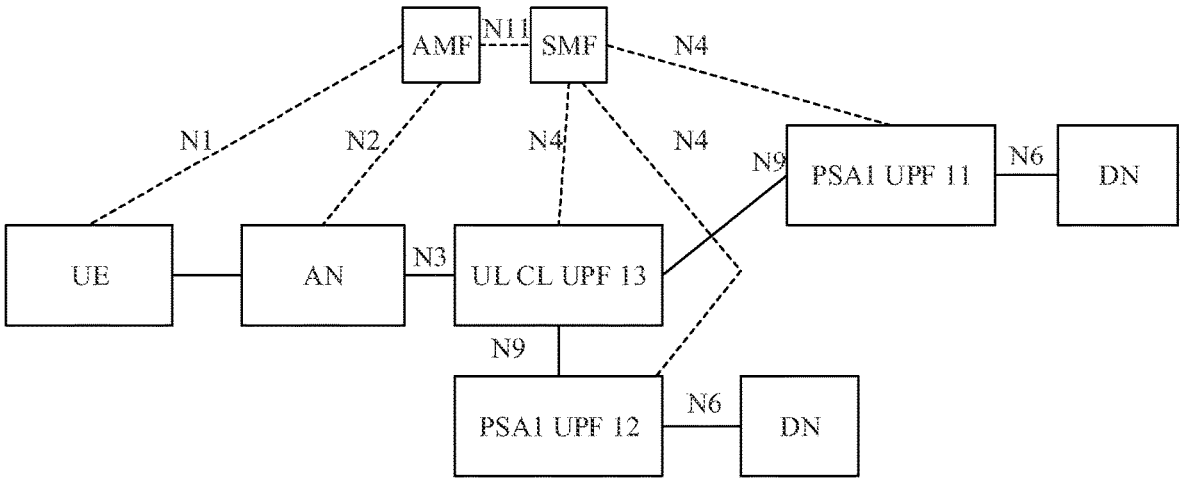
FIG. 1A is a schematic diagram of a deployment architecture of an uplink classifier (UL CL) offloading scheme in the related art.

In order to make purposes, technical solutions and advantages of the disclosure clear, the technical solutions of the disclosure are further described in detail below in combination with the accompanying drawings and embodiments. The described embodiments shall not be regarded as limitations of the disclosure, and all other embodiments obtained by those skilled in the art without inventive work fall within the scope of protection of the disclosure.

The following description involves "some embodiments" describes a subset of all possible embodiments, but it is understood that "some embodiments" may be the same subset or different subsets of all possible embodiments and may be combined with each other without conflict.

The terms "first"/"second"/"third" involved are only to distinguish similar objects and do not represent a particular order of objects. It is understood that the terms "first"/"second"/"third" may be interchanged for a particular order or sequence, so that the embodiments of the disclosure described herein can be implemented in an order other than those illustrated or described herein.

Unless otherwise defined, all technical and scientific terms used herein have the same meaning as commonly understood by those skilled in the art that belong to the technical field of the disclosure. Terms used herein are used only for the purpose of describing the disclosure and are not intended to limit the disclosure.

Before describing the embodiments of the disclosure in detail, the words and terms involved in the embodiments of the disclosure are explained at first, and the words and terms involved in the embodiments of the disclosure are applicable to the following explanations.

A terminal may be a mobile phone, a tablet computer, a computer with a wireless transceiver function, a virtual reality terminal, an augmented reality terminal, a wireless terminal in industrial control, a wireless terminal in self-driving, a wireless terminal in remote medical surgery, a wireless terminal in a smart grid, a wireless terminal in transportation safety, a wireless terminal in smart city, a wireless terminal in smart home, etc.

A private network is a professional network that provides communication services for specific users by realizing network signal coverage in a specific area. The private network is a dedicated network that provides network communication services for specific users. A difference between a public network and the private network may lie in a fact that the public network serves the public while the private network serves specific users.

Packet data unit (PDU) connection service is a service that provides PDU exchange between a terminal and a data network.

A PDU session is an association between the terminal and the data network that provides the PDU connection service.

Unified data management (UDM) is responsible for managing user ID, contract data, and authentication data, and managing users' service network element registration, such as an Access and Mobility Management Function (AMF), a session management function (SMF), etc., that currently provide services for the terminal, etc. For example, when a user switches an accessed AMF, the UDM may initiate a cancel message to the old AMF, to request the old AMF to delete user-related information.

Unified Data Repository (UDR) is used for the UDM to store subscription data or read subscription data, and for a policy control function (PCF) to store policy data or read policy data.

The PCF supports a unified policy framework to manage network behaviors, provides policy rules for network entities to implement and enforce, and accesses subscription information from the UDR.

User plane function (UPF): 5G UPF. The UPF, as a user plane network element of a 5G core network (5GC), can support routing and forwarding of terminal service data, data and service identification, and action and policy execution, etc. The UPF interacts with the SMF through a N4 interface and is under a direct control and management of the SMF, and the UPF performs service flow processing based on various policies issued by the SMF.

The 5G dual-domain private network is mainly for campus, government, large enterprises and institutions and other scenarios. In such scenarios, the user generally has a demand for using a personal to-customer (2C) terminal to access an enterprise private network and the Internet at the same time. Therefore, it is necessary to solve the problem of a 2C user simultaneously accessing a dual-domain network through the 5G dual-domain private network. When establishing the 5G dual-domain private network, a customer usually deploys a service platform in a private network of the customer for security isolation and data privacy, and the private network of the customer is connected to a specific UPF (i.e., special-line UPF) of the operator through a physical special line.

The dual-domain private network can satisfy the service demand of accessing both a public network and an internal network of a public network user without changing a phone card or a phone number based on three types of technical solutions, namely, a dedicated Data Network Name (DNN) based offloading scheme, a UL CL based offloading scheme and a network side multi-DNN session customization scheme. The UL CL based offloading scheme is to subscribe a general DNN (e.g., CMNET) for users of the dual-domain private network, so that the users use the general DNN to establish the PDU session. UL CL offloading is realized by inserting a UL CL UPF as a classifier into an original session of the terminal, and the UL CL UPF performs offloading according to a destination IP address of an uplink message based on an offloading rule, which is subscribed by the user in the PCF/UDR, includes a set of target URLs or a set of destination IP addresses, and is installed by the SMF into the UL CL UPF when inserting the UL CL UPF.

FIG. 1A is a schematic diagram of a deployment architecture of a UL CL offloading scheme in the related art. As illustrated in FIG. 1, the UL CL network architecture includes a PSA1 (PDU session anchor 1) UPF 11 (i.e., a primary anchor UPF), a PSA2 UPF 12 (i.e., a secondary anchor UPF), and a UL CL UPF 13 (i.e., an uplink classifier UPF). The primary anchor UPF is used to assign an IP address to a terminal when the terminal establishes a PDU session, and is connected to an external network DN1 through a N6 interface. The secondary anchor UPF 12 is inserted at the same time as inserting the UL CL UPF 13 when activating the offloading, and is connected to a local network DN2 through the N6 interface. The UL CL UPF 13 is used to implement an uplink classifier function, and is inserted into a user session by the SMF when activating the offloading.

The UL CL UPF 13 is connected to the primary anchor UPF and the secondary anchor UPF respectively through a N9 interface. For uplink traffic, destination IP addresses of uplink data packets are checked according to an offloading rule, and messages that need to be sent to the primary anchor UPF and the secondary anchor UPF are classified and forwarded respectively based on the identified destination IP addresses. For downlink traffic, messages from the primary anchor UPF and the secondary anchor UPF are aggregated and forwarded to a base station through a N3 interface. For the uplink traffic, if a destination IP of an uplink data packet matches a destination IP included in an offloading rule, the uplink data packet is forwarded to the secondary anchor UPF. For a data packet whose destination IP does not match the destination IP address included in the offloading rule, the uplink data packet is forwarded to the primary anchor UPF. In an actual network deployment, the UL CL UPF 13 and the secondary anchor UPF are usually set up together, with one set of UPFs implementing both the UL CL offloading function and the secondary anchor function. In some scenarios, the primary anchor UPF, the UL CL UPF, and the secondary anchor UPF can also be set up together.

Figure 1B:
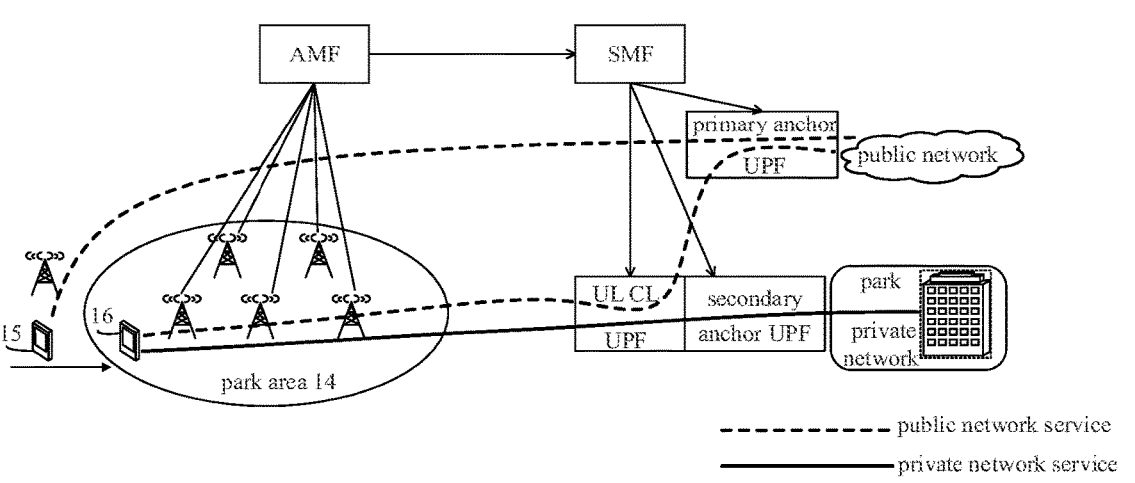
FIG. 1B is a schematic diagram of a networking scheme for a UL CL offloading method that does not distinguish users in the related art.
Figure 1C:
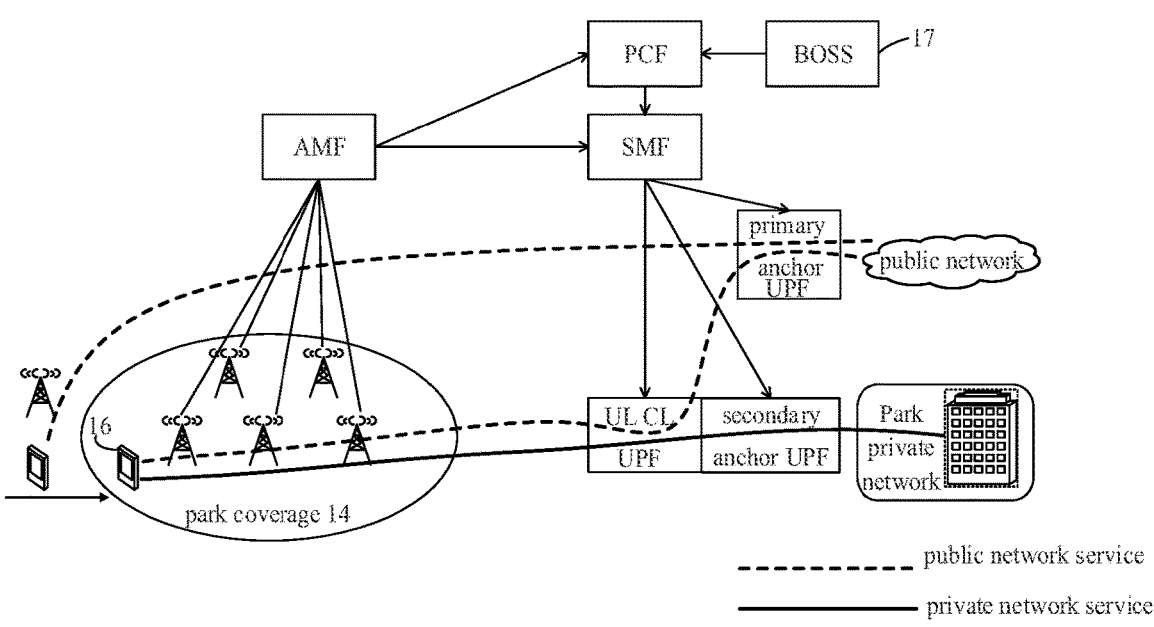
FIG. 1C is a schematic diagram of a networking scheme for a UL CL offloading method that distinguishes users in the related art.

The technical schemes based on UL CL offloading can be classified into offloading schemes that require distinguishing users and offloading schemes that do not require distinguishing users. In the offloading schemes that do not require distinguishing users, the SMF inserts the UL CL for all the users that enter a park area and completes local offloading. The corresponding networking scheme is shown in FIG. 1B, in which the dashed line indicates public network services, and the thick line indicates private network services. The AMF manages a coverage range 14 of a park area containing one or more Tracking Area (TA) lists. A user corresponding to a terminal 15 outside the coverage range 14 of the park area can access the public network directly through the primary anchor UPF. For a user corresponding to a terminal 16 inside the coverage range 14 of the park area, the SMF can insert the UL CL UPF to complete local offloading. That is, traffic for accessing the private network is forwarded to the park private network and the traffic for accessing the public network is forwarded to the public network through the secondary anchor UPF. Networking access corresponding to the offloading schemes that require distinguishing users is shown in FIG. 1C, in which the dashed line indicates public network services, and the thick line indicates private network services. The AMF is responsible for 1 or more TA lists. A supervisor (BOSS) 17 is configured to perform subscription for a user corresponding to a terminal 16 in the coverage range 14 of the park area, and the PCF inserts the UL CL UPF and issues an offloading rule to the terminal 16 that enters the park area according to a subscription condition of the user, to complete the local offloading.

Figure 1D:
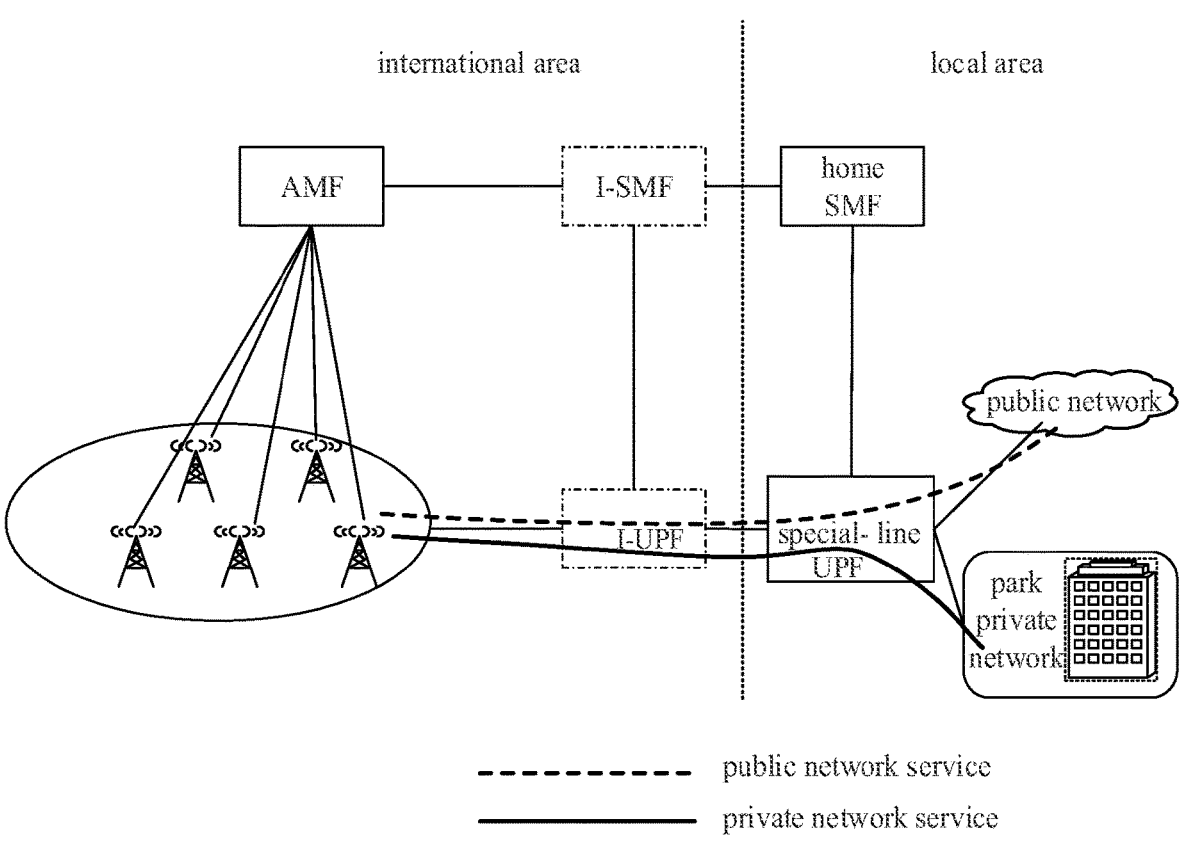
FIG. 1D is a schematic diagram of a networking scheme for a dedicated DNN offloading method in the related art.

The dedicated DNN offloading technology provides subscription of a dedicated DNN for a user of the dual-domain private network. A terminal of the dual-domain private network, regardless of where it is, establishes a PDU session through the dedicated DNN. The network always determines a special-line UPF located in a place where the private network belongs as the anchor UPF for the terminal. As shown in FIG. 1D, the dashed line indicates public network services, and the thick line indicates private network services. All service traffic of the terminals of the dual-domain private network within the AMF's coverage range, including both the traffic for accessing the public network and the traffic for accessing the private network, are classified and offloaded to the public network and the park private network respectively through the special-line UPF 18 at the place where it belongs.

The terminal side multi-DNN offloading technology provides subscription of a dedicated DNN and a general DNN for the terminal. The terminal uses the dedicated DNN to access private network services and use the general DNN to access public network services.

A basic principle of the network-side multi-DNN offloading technology is that the network side provides subscription of both the dedicated DNN and the general DNN for the users of the dual-domain private network, and the terminal side only needs to support the general DNN. The terminal uses the general DNN to establish the PDU session. When the UPF detects that the IP address accessed by the terminal is an IP address of the private network, the UPF simulates the terminal and triggers the AMF and the SMF to establish a virtual dedicated DNN-PDU session on the network side. The core network side completes mapping among multiple PDU sessions, and the UPF forwards a data stream of the private network to the special-line UPF through the PDU session of the dedicated DNN.

However, a disadvantage of the above general DNN+UL-CL offloading technology is that user can access the dual-domain private network only within the local network, and the dual-domain private network cannot be accessed during roaming or international roaming. If a company customer terminal moves out of the local network, it can only access the public network and cannot access the company customer private network. Therefore, it is impossible to satisfy the demand of the users of the dual-domain private network to access the private network while roaming, such as government website.

The disadvantage of the dedicated DNN offloading technique is that, when the terminal is in domestic roaming, both traffic for accessing the public network and traffic for accessing the private network may flow back to the special-line UPF at the location where the user belongs, and then offloaded to the public network and the private network through the special-line UPF respectively. For the user accesses the public network services, there are traffic detours, which affects the perception of public network services and takes up additional bandwidth of backbone networks of the operator. Meanwhile, when the terminal roams abroad, the terminal cannot use either the public network services or the private network services. In addition, since the user's IP address is assigned by the special-line UPF at the location where the user belongs, during domestic roaming, the terminal uses an IP address assigned by the special-line UPF at the location where the user belongs, and it is impossible to finely classify the IP address according to the district and county in which the user roams, and thus it fails to satisfy the supervisory requirement of fine classification of the IP address.

The disadvantages of the terminal side multi-DNN offloading technique are that there are additional requirements for terminals. The terminals are required to support URSP, which is not supported by mainstream terminals currently. Or, customized modification is required for the terminal, with high cost, and part of the mainstream terminals (e.g., terminals having the IOS system) do not support modification. The terminal that supports the modification may require the user to carry out the corresponding manual operation on an interface of the terminal to switch the DNN, which is not good for the user's perception.

The disadvantage of the network side multi-DNN offloading technique is that it requires customized functional modifications to the full-net AMF, SMF, PCF and UPF of the network, to achieve the establishment of the dedicated DNN session based on service flow detection, which requires a large modification amount and a high modification cost.

The embodiments of the disclosure provide a data offloading method, which is performed by a processor of a computer device. The computer device may refer to a server, a laptop, a tablet computer, a desktop computer, a smart TV, a set-top box, a mobile device (e.g., a mobile phone, a portable video player, a personal digital assistant, a dedicated messaging device, and a portable game device), and other devices that have the capability of data offloading. FIG. 2 is an optional flowchart of a data offloading method provided by an embodiment of the disclosure. As illustrated in FIG. 2, the method is performed by an UL CL UPF in a dual-domain private network system. The dual-domain private network system includes a SMF, a PCF for subscribing an offloading rule for a target user, a UDM for subscribing a dedicated DNN and a general DNN for the target user. The method includes the following steps S210 to S230.

At step S201, in response to receiving an uplink data packet sent by the target user in a non-international roaming scenario, it is detected whether the uplink data packet matches a set of target URLs and/or destination IP addresses included in the offloading rule.

The target user is a user of a 5G dual-domain private network associated with the general DNN and the dedicated DNN subscribed in the UDM. The non-international roaming scenario includes a local access scenario and a domestic roaming scenario. That is, the users of the 5G dual-domain private network are supported to access the public network and the private network while roaming domestically.

The offloading rule is configured by the SMF when the SMF inserts the UL CL UPF during the establishment of a PDU session based on the dedicated DNN. That is, the PCF in the dual-domain private network system is subscribed by the target user, configured in the UL CL UPF by the SMF, and inserted during the establishment of the PDU session. The offloading rule at least includes a set of target URLs/ destination IP addresses corresponding to a customer private network. In some other implementations, the offloading rule may also include an International Mobile Subscriber Identity (IMSI) and a Mobile Station International ISDN Number (MSISDN) of a terminal.

At step S220, in response to a matching result being yes, the uplink data packet is forwarded to a primary anchor UPF to access a user private network.

If the UL CL UPF detects that a target URL or a destination IP uplink-accessed by a terminal in the 5G dual-domain private network is included in a set of URLs and IPs of the private network, the UL CL UPF sends the data packet including the URL or destination IP of the private network to the primary anchor UPF through a N9 interface.

In the non-international roaming scenario, the AMF obtains the dedicated DNN subscribed by the user and the 5G dual-domain private network identifier from a UDM/ UDR to which the user belongs, and determines the SMF of the session for the user through the dedicated DNN. The primary anchor UPF is determined based on the dedicated DNN. In some implementations, the SMF determines a special-line UPF for the user as the primary anchor UPF based on the dedicated DNN.

At step S230, in response to the matching result being no, the uplink data packet is forwarded to a secondary anchor UPF to access a public network.

The secondary anchor UPF is determined based on the general DNN. If the UL CL UPF detects that the target URL or destination IP uplink-accessed by a UE in the 5G dual-domain private network is not included in the set of URLs and IPs of the private network, the UL CL UPF sends the IP data packet to the secondary anchor UPF over the N9 interface.

In the embodiment of the disclosure, by subscribing the general DNN and the dedicated DNN for the target user in the UDM, the offloading rule is configured and the UL CL UPF is inserted by the SMF when establishing the PDU session based on the dedicated DNN. By using the UL CL UPF, the data for accessing the public network in the uplink data packet sent by the target user in the non-international roaming scenarios is offloaded to the secondary anchor UPF, and the data for accessing the user private network is offloaded to the primary anchor UPF. Therefore, the user of the 5G dual-domain private network is supported to access the private network services during domestic roaming at anytime and anywhere. At the same time, nearby offloading for accessing the public network services is realized, to avoid routing detours of public network services. Meanwhile, there is no additional functional requirements for the terminal, as long as the terminal can support a single DNN, which has a small scope of network modification and low modification cost.

In some implementations, the UL CL UPF is determined by the SMF based on the general DNN and a location of the target user, and the UL CL UPF serves as the secondary anchor UPF.

When the SMF determines the UL CL UPF, it determines a nearby UPF as the UL CL UPF according to a location of a UE (e.g., TA) and the general DNN (e.g., CMNET). That is, the UL CL UPF determined by the SMF for the user of the 5G dual-domain private network must be responsible for the services of the general DNN (e.g., CMNET). Meanwhile, the SMF uses the determined UL CL UPF as the secondary anchor UPF, so that group routing and forwarding of uplink data packets can be achieved through the UL CL UPF, and public network traffic is channeled locally without having to go back to the special-line UPF of the location where the user belongs, to avoid detours and roundabout of public network traffic. Meanwhile, the UL CL UPF and the secondary anchor UPF are set up together, i.e., a set of UPFs realizing both the UL CL offloading function and the secondary anchor function can reduce delay and network costs.

In some implementations, during establishing the PDU session, the method further includes: receiving a binding relation between a first IP address and a second IP address sent by the SMF, in which the first IP address is assigned by the primary anchor UPF for a user terminal corresponding to the target user, and the second IP address is assigned by the secondary anchor UPF for the user terminal in response to a request from the SMF; and associating the binding relation to the PDU session. Correspondingly, before forwarding the uplink data packet to the primary anchor UPF, the method further includes: switching a source IP address of the uplink data packet from the second IP address to the first IP address based on the binding relation.

In this way, the SMF sends the first IP address and second IP address that are bound with each other to the UL CL UPF over the N4 interface, and the UL CL UPF saves the binding relation between the first IP address and the second IP address and associates the binding relation with the PDU session. When the UL CL UPF detects that a destination IP address or a target URL in the uplink data packet of the PDU session of the UE of the 5G dual-domain private network is included in the set of URLs and destination IP addresses of the offloading rule, the source IP address of the uplink data packet is switched from the second IP address to the first IP address, so that the IP address of the user can be finely-classified during domestic roaming, and the supervisory requirements can be satisfied.

In some implementations, after receiving a downlink data packet sent by the primary anchor UPF, the method further includes: switching a destination IP address of the downlink data packet from the first IP address to the second IP address based on the binding relation; and forwarding the downlink data packet with a switched IP address to the user terminal via an AMF.

In this way, after the UL CL UPF receives the downlink data packet from the primary anchor UPF, the destination IP address of the downlink data packet is switched from the first IP address to the second IP address, and the downlink data packet can be accurately sent to the terminal via the base station.

FIG. 3A is an optional flowchart of a data offloading method provided by an embodiment of the disclosure. The method is performed by a SMF in a dual-domain private network system. The dual-domain private network system includes a UL CL UPF network element, a PCF for subscribing an offloading rule for a target user, a UDM for subscribing a dedicated DNN and a general DNN for the target user. As illustrated in FIG. 3A, the method includes the following steps S310 to S320.

At step S310, the offloading rule subscribed by the target user is received from the PCF.

The offloading rule at least includes a remote offloading identifier, and the remote offloading identifier is configured to indicate the SMF to insert the UL CL UPF when establishing a PDU session for the target user. The target user refers to a user of a 5G dual-domain private network associated with the general DNN and the private DNN subscribed in the UDM.

In an implementation, an offloading rule of the private network session is subscribed by the user of the 5G dual-domain private network in a PCT/UDR of a home operator. The offloading rule at least includes a set of target URLs/destination IP addresses corresponding to the user private network, an IMSI and a MSISDN of the terminal. The offloading rule of the user of the 5G dual-domain private network is assigned with one remote offloading identifier. This remote offloading identifier is a special identifier for the user of the 5G dual-domain private network.

At step S320, the UL CL UPF is inserted when establishing the PDU session using the dedicated DNN based on the remote offloading identifier.

The offloading rule is sent from the PCF/UDR of a location where the user belongs to the SMF when the user of the 5G dual-domain private network establishes the PDU session, and the SMF inserts a UL CL UPF in the PDU session in accordance with the remote offloading identifier of the offloading rule and installs the offloading rule into the UL CL UPF.

In the embodiment of the disclosure, by subscribing the general DNN and the dedicated DNN, the UL CL UPF is inserted by the SMF when establishing the PDU session based on the dedicated DNN, so that the UL CL UPF can perform offloading and forwarding based on the offloading rule. Therefore, the user of the 5G dual-domain private network is supported to access the private network services during domestic roaming, while realizing nearby offloading of accessing public network services, thereby avoiding the routing detour of the public network services.

In some implementations, the above step S320 may be further realized by: determining a UPF that is closest to a terminal as the UL CL UPF using the general DNN based on the remote offloading identifier; configuring the offloading rule for the UL CL UPF; and inserting the UL CL UPF when establishing the PDU session.

In this way, after receiving the offloading rule, the SMF first detects whether there is a remote offloading identifier, so as to provide the service offloading technology of the dual-domain private network only for the target user. Meanwhile, the nearby UPF that can be responsible for the services of the general DNN is determined as the UL CL UPF, and the UL CL UPF realizes group routing and forwarding of the uplink data packet. The public network traffic is channeled locally without having to go back to the special-line UPF of the location where the user belongs, to avoid detours and roundabout of the public network traffic.

In some implementations, when the target user is in a domestic roaming scenario, the PDU session further includes an I-SMF and an I-UPF. The method further includes: connecting the SMF to the I-SMF, and determining the I-UPF as the UL CL UPF via the I-SMF.

In this way, after the target user travels beyond a SMF service area (POOL range), the I-SMF is a SMF of a roaming area, so that the I-UPF determined by the I-SMF is used as the UL CL UPF, and the UL CL UPF is used to realize routing and forwarding of the uplink data packet to the public or private network based on the offloading rule. In this way, the user of the 5G dual-domain private network can still be supported to access the public network services when roaming internationally.

In some implementations, during establishing the PDU session, the method further includes: receiving a first IP address assigned by a primary anchor UPF for a user terminal of the target user, in which the primary anchor UPF is determined based on the dedicated DNN; sending an IP address request to a secondary anchor UPF based on the remote offloading identifier in the offloading rule, in which the secondary anchor UPF is determined based on the general DNN; receiving a second IP address assigned by the secondary anchor UPF for the user terminal and sending the second IP address to the user terminal; and binding the first IP address with the second IP address and sending a binding relation to the UL CL UPF.

In this way, during the establishment of the PDU session, the SMF obtains the first IP address through the primary anchor UPF and obtains the second IP address through the secondary anchor UPF, respectively, binds the first IP address with the second IP address, and sends a binding relation to the UL CL UPF through the N4 interface, to enable the UL CL UPF to associate the binding relation with the PDU session. Thus, the user is supported to finely classify the IP address when the user roams domestically, and the supervisory requirements are satisfied.

Figure 3B:
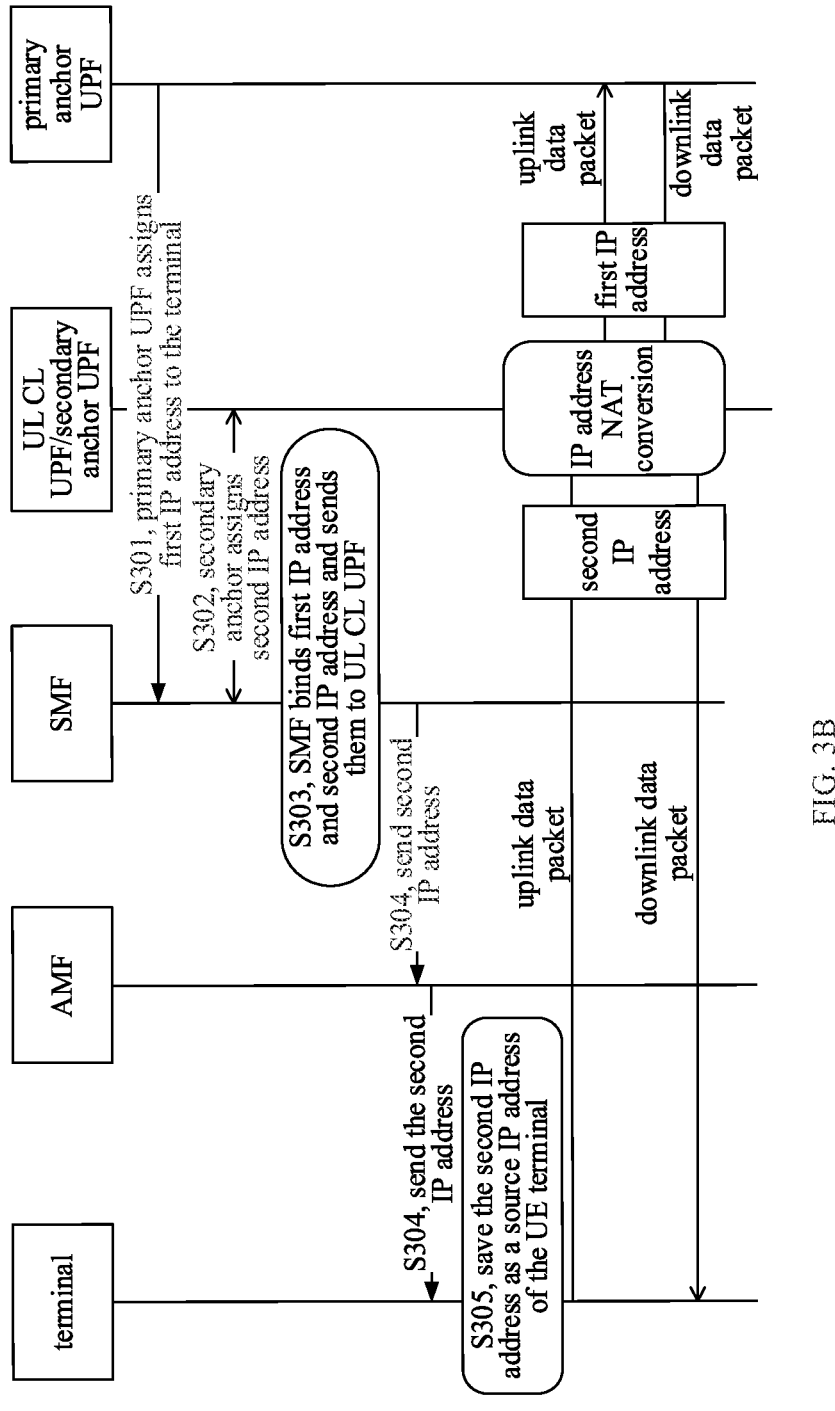
FIG. 3B is an interaction flowchart of IP address conversion during establishing a user plane function (PDU) session provided by an embodiment of the disclosure.

FIG. 3B is an interaction flowchart of IP address conversion when establishing a PDU session provided by an embodiment of the disclosure. As illustrated in FIG. 3B, the method includes the following steps S301 to S305.

At step S301, the primary anchor UPF assigns the first IP address to the terminal and sends the first IP address to the SMF.

After the primary anchor UPF assigns the first IP address to the terminal, it sends the first IP address to the SMF through the N4 interface.

At step S302, the SMF requests the secondary anchor UPF to assign the second IP address to the terminal.

The SMF requests the secondary anchor UPF to assign the second IP address for the terminal based on an ID of a user of the 5G dual-domain private network in the offloading rule, and the secondary anchor UPF sends the second IP address to the SMF through the N4 interface.

At step S303, the SMF binds the first IP address with the second IP address and sends the bind relation to the UL CL UPF.

The SMF sends the first IP address and second IP address that are bound with each other to the UL CL UPF over the N4 interface, and the UL CL UPF saves the binding relation between the first IP address and the second IP address and associates the binding relation with the PDU session.

At step S304, the SMF sends the second IP address to the AMF, and the AMF transfers it to the terminal.

The SMF sends the second IP address to the AMF in the "Namf_Communication_N1N2MessageTransfer" process, and then the AMF transfers it to the terminal in the "PDU Session Establishment Accept" process.

At step S305, the terminal saves the second IP address as a source IP address of the terminal.

After the establishment of the PDU session of the terminal is completed, the terminal starts to send and receive data. If the UL CL UPF detects that a destination IP address or a target URL of the uplink data packet of the PDU session of the terminal of the 5G dual-domain private network is included in the set of URLs/destination IP addresses in the offloading rule, the source IP address of the uplink data packet is switched from the second IP address to the first IP address. The UL CL UPF offloads the uplink data packet to the primary anchor UPF (e.g., special-line UPF), and the primary anchor UPF sends the uplink data packet to the user private network.

In some implementations, if the target URL/destination IP address of the uplink data packet is not included within the set of target URLs/destination IP addresses in the offloading rule, the UL CL UPF sends the uplink data packet to the secondary anchor UPF, and the secondary anchor UPF sends the uplink data packet to the public network. In some implementations, the secondary anchor UPF and the UL CL UPF are set up as a set of UPFs.

In the embodiment of the disclosure, the secondary anchor assigns the second IP address for the terminal and provides IP address NAT conversion, so that when the terminal of the 5G dual-domain private network is roaming, the IP address of the terminal can be finely classified by the UPF of the roaming area according to the districts and counties, to satisfy the supervisory requirements.

Figure 4:
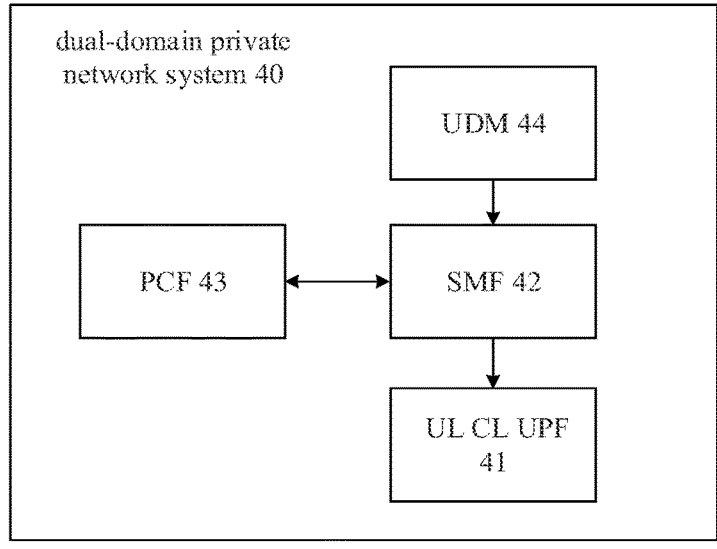
FIG. 4 is a system framework of a dual-domain private network system provided by an embodiment of the disclosure.

FIG. 4 is a system framework of a dual-domain private network system provided by an embodiment of the disclosure. As illustrated in FIG. 4, the dual-domain private network system 40 includes: a UL CL UPF 41, a SMF 42, a PCF 43, and a UDM 44.

The UDM 44 is configured to store subscription data of a user, in which the subscription data includes a dedicated DNN, a general DNN, and an associated target user.

The PCF 43 is configured to subscribe an offloading rule for the target user, and send the offloading rule to the SMF in response to a request from the SMF, in which the offloading rule at least includes a remote offloading identifier, and the remote offloading identifier is configured to indicate the SMF to insert the UL CL UPF when establishing a PDU session for the target user.

The SMF 42 is configured to receive the offloading rule, and insert the UL CL UPF when establishing the PDU session using the dedicated DNN based on the remote offloading identifier.

The UL CL UPF 41 is configured to offload data for accessing a public network in an uplink data packet to a secondary anchor UPF and offload data for accessing a user private network to a primary anchor UPF based on the offloading rule.

In an implementation, the private DNN and the general DNN are subscribed by the target user in the UDM 44 (or UDR) of a home operator HPLMN. Moreover, the target user is identified in the UDM/UDR as a user of the 5G dual-domain private network. The offloading rule for the session of the private network is subscribed by the user of the 5G dual-domain private network in the PCF/UDR of the home operator A.

In some implementations, the UDM 44 is further configured to send a corresponding DNN subscribed by an associated user corresponding to a user ID to a corresponding AMF based on an operator of a visited access network and the user ID, in which the SMF is determined by the corresponding AMF based on the dedicated DNN.

In some implementations, the UDM sending the corresponding DNN subscribed by the associated user corresponding to the user ID to the corresponding AMF based on the operator of the visited access network and the user ID includes: in response to detecting that the associated user is the target user and the associated user is located in a visited network of a home operator, the UDM providing a first AMF with the dedicated DNN in response to a request of obtaining contract data of the first AMF of the home operator; in response to detecting that the associated user is the target user and the associated user is located in a visited network of a visited operator, the UDM providing a second AMF with the general DNN in response to a request of obtaining contract data of the second AMF of the visited operator, in which the visited operator is different from the home operator; and in response to detecting that the associated user is not the target user, the UDM providing all subscribed DNNs to an AMF that requests the contract data.

In this way, although the dedicated DNN has been subscribed by the user of the 5G private network, the user can still access public network services when roaming internationally.

For example, when the UDM/UDR determines that the user is a user of the 5G dual-domain private network and performs access within a network of a domestic operator A (i.e., in the non-international roaming scenario), when the AMF of the domestic operator A obtains the subscription data of the user from the UDM/UDR where the user belongs, the UDM/UDR only provides the dedicated DNN subscribed by the user to the AMF of the domestic operator A. When the UDM/UDR determines that the user of the 5G dual-domain private network performs access outside the network of the operator A (i.e., in the international roaming scenario, e.g., located in a network of an operator B), when the AMF of the foreign operator B obtains the subscription data of the user from the UDM/UDR of the operator A to which the user belongs, and the UDM/UDR only provides the general DNN (e.g., CMNET) subscribed by the user to the roaming AMF of the operator B.

In some implementations, the offloading rule further includes a set of target URLs and/or destination IP addresses corresponding to the user private network, and the UL CL UPF offloading data for accessing the public network in the uplink data packet to the secondary anchor UPF and offloading data for accessing the user private network to the primary anchor UPF based on the offloading rule, includes: in response to detecting that the uplink data packet matches the set of target URLs and/or destination IP addresses, the UL CL UPF forwarding the uplink data packet to the user private network via the primary anchor UPF, in which the primary anchor UPF is determined based on the dedicated DNN; and in response to detecting that the uplink data packet does not match the set of target URLs and/or destination IP addresses, the UL CL UPF forwarding the uplink data packet to the public network via the secondary anchor UPF, in which the secondary anchor UPF is determined based on the general DNN.

After establishment of the PDU session of the user of the 5G dual-domain private network is completed, the terminal starts to send and receive data. After an uplink data packet arrives at the UL CL UPF, the UL CL UPF checks a target URL or a destination IP address of the uplink data packet. According to the remote offloading identifier in the offloading rule of the dual-domain private network, if the target URL or destination IP address of the uplink data packet is included in the set of private-network target URLs or private-network destination IP addresses in the offloading rule, the UL CL UPF offloads the uplink data packet to the primary anchor UPF (e.g., special-line UPF), and the primary anchor UPF forwards the data packet to the user private network. If the target URL or the destination IP address of the uplink data packet is not included in the set of private-network target URLs or private-network destination IP addresses in the offloading rule, the UL CL UPF sends the uplink data packet to the secondary anchor UPF, and the secondary anchor UPF forwards it to the public network. In this way, the user of the 5G dual-domain private network can access the private network services at anytime and anywhere during domestic roaming, at the same time, nearby offloading for accessing public network services is realized, thereby avoiding routing detours of public network services.

In some implementations, in a non-international roaming scenario, the UL CL UPF is determined by the SMF based on the general DNN and the location of the target user, and the UL CL UPF serves as the secondary anchor UPF.

When the SMF determines the UL CL UPF, it determines a nearby UPF as the UL CL UPF according to the location of the UE (e.g., TA) and the general DNN (e.g., CMNET). That is, the UL CL UPF determined by the SMF for the user of the 5G dual-domain private network is responsible for the services of the general DNN (e.g., CMNET). Meanwhile, the SMF uses the determined UL CL UPF as the secondary anchor UPF. In this way, the user of the 5G dual-domain private network can access private network services during domestic roaming, and at the same time, nearby offloading for accessing public network services is realized, thereby avoiding routing detours for public network services.

In some implementations, the SMF is further configured to bind a first IP address assigned by the primary anchor UPF to the terminal with the second IP address assigned by the secondary anchor UPF to the terminal, and send a binding relation to the UL CL UPF.

During the establishment of the PDU session of the user of the 5G dual-domain private network, the primary anchor UPF assigns the first IP address for the terminal, and then sends the first IP address to the SMF through the N4 interface. According to the remote offloading identifier of the user of the 5G dual-domain private network in the offloading rule, the SMF requires the secondary anchor UPF to assign the second IP address to the UE, and the secondary anchor UPF sends the second IP address to the SMF via the N4 interface. At this time, the SMF binds the first IP address with the second IP address, and sends the second IP address to the AMF. The AMF transfers the second IP address to the terminal, and the terminal saves the second IP address as the UE address. Meanwhile, the SMF transfers the first IP address and second IP address bound with each other to the UL CL UPF through the N4 interface, so that the UL CL UPF can save the binding relation between the first IP address and the second IP address and associates the binding relation with the PDU session. When the UL CL UPF detects that a destination IP address or a target URL of the uplink data packet in the PDU session of the user of the 5G dual-domain private network is included in the set of private-network target URLs/private-network destination IP addresses in the offloading rule, the source IP address of the uplink data packet is switched from the second IP address to the first IP address. When the UL CL UPF detects that the destination IP address or the target URL of the uplink data packet in the PDU session of the user of the 5G dual-domain private network is not included in the set of private-network target URLs/private-network destination IP addresses in the offloading rule, after receiving a downlink data packet from the primary anchor UPF, the UL CL UPF switches a destination IP of the downlink data packet from the first IP address to the second IP address. By doing so, when the user of the dual-domain private network accesses the public network during domestic roaming, the IP address of the user can be finely classified according to the districts and counties, to satisfy the supervisory requirements.

In the embodiment of the disclosure, by subscribing the general DNN and the dedicated DNN in the UDM for the target user, the offloading rule is configured and the UL CL UPF is inserted by the SMF during establishing the PDU session based on the dedicated DNN. The UL CL UPF is used to offload the data for accessing the public network in the uplink data packet sent by the target user in the non-international roaming scenario to the secondary anchor UPF, and offload the data for accessing the user private network to the primary anchor UPF. Therefore, the user of the 5G dual-domain private network is supported to access the private network and the public network during domestic roaming, and the public network traffic is channeled locally without having to go back to the special-line UPF of the area where the user belongs for offloading, so as to avoid detours and roundabout of the public network traffic. Meanwhile, there is no additional functional requirements for the terminal, as long as the terminal supports a single DNN, which has a small scope of network modification and low modification cost.

The above data offloading method is described below in combination with a specific embodiment. However, it is worth noting that the specific embodiment is only for better illustration of the disclosure and does not constitute an undue limitation of the disclosure.

The 5G dual-domain private network is mainly for campus, government, large enterprises and institutions and other scenarios, to satisfy the generally existed demand of the user for using a personal 2C terminal to access an enterprise private (2B) network and the Internet (2C) network at the same time. The 5G dual-domain private network is one of the current focuses of the various operators, and it is an important opportunity for 5G to integrate to campus network and government network. Currently, mature offloading technologies of the dual-domain private network schemes include UL CL offloading and dedicated DNN offloading. However, there are limiting scenarios. For example, for the UL CL offloading technology, the private network can only be accessed locally, and the user cannot access the private network when roaming to foreign cities or provinces. For the dedicated DNN offloading technology, when the user accesses the public network while roaming, there are traffic detours to the location where the user belongs, thereby affecting service perception.

The existing UL CL offloading technology is location-based trigger offloading. That is, when the SMF detects that the user enters a specific area, the UL CL offloading is triggered, and the UL CL UPF is inserted in the PDU session. The existing UL CL offloading technology can only be used in a local range, such as a specific campus or within a local network. If the user travels beyond a specific area, such as the campus or the local network, offloading cannot be triggered, and thus the user of the 5G dual-domain private network cannot access the private network service while roaming using the existing UL CL offloading technique.

The embodiment of the disclosure provides a 5G dual-domain private network apparatus, including a UDM/UDR, a PCF/UDR, a SMF, and a UPF.

The UDM/UDR includes a first storage device, a first determining device and a first sending device. The first storage device is responsible for storing subscription data of a user. In the subscription data, a dedicated DNN, a general DNN, and a 5G dual-domain private network identifier are subscribed by the user of the 5G dual-domain private network. The first determining device is responsible for determining, based on a MCC field included in a domain name of an AMF, whether the AMF is an AMF of a home operator HPLMN or an AMF of a visited operator VPLMN. The first sending device is responsible for sending the subscribed DNN to the AMF according to a determination result of the first determining device. If the first determining device determines that the AMF is the AMF of the home operator and the user is a user of the 5G dual-domain private network, the first sending device sends, according to a request of the AMF, the dedicated DNN subscribed by the user to the AMF. If the first determining device determines that the AMF is the AMF of the visited operator VPLMN and the user is a user of the 5G dual-domain private network, the first sending device sends the general DNN subscribed by the user to the AMF. If the first determining device determines that the user is not a user of the 5G dual-domain private network, the first sending device sends all DNNs subscribed by the user to the AMF.

The PCF/UDR includes a second storage device and a second sending device. The second storage device is responsible for storing a subscription policy of a user, i.e., the offloading rule. The offloading rule includes a set of target URLs/destination IP addresses corresponding to a user private network and a remote offloading identifier of the 5G dual-domain private network. The remote offloading identifier is used to instruct the SMF to insert a UL CL UPF using a dedicated DNN when establishing a PDU session for a user of the 5G dual-domain private network. The offloading rule at least includes the following rules. If the UL CL UPF detects that a target URL or a destination IP of an uplink access of a user in the 5G dual-domain private network is included in the set of URLs and IPs of the private network, the UL CL UPF sends a data packet including the target URL/destination IP of the private network to the primary anchor UPF via the N9 interface. If the UL CL UPF detects that the target URL or the destination IP of the uplink access of the UE in the 5G dual-domain private network is not included in the set of URLs and IPs of the private network, the UL CL UPF sends an IP data packet to the secondary anchor UPF via the N9 interface. The second sending device sends the offloading rule to the SMF based on a request of the SMF.

The SMF includes a receiving device, a second determining device and a third sending device. The receiving device is responsible for receiving the offloading rule from the PCF. The second determining device is responsible for determining whether a remote offloading identifier of the 5G dual-domain private network is included in the offloading rule. If the offloading rule includes the remote offloading identifier and the user establishes a PDU session using the subscribed dedicated DNN, the SMF inserts a UL CL UPF in the PDU session, otherwise, the SMF establishes a PDU session in accordance with a 3GPP standard process. The third sending device is responsible for installing the offloading rule into the UL CL UPF via the N4 interface.

The UL CL UPF includes a detection device and a forwarding device. The detection device is responsible for detecting whether a target URL/a destination IP address of an uplink IP data packet of the UE matches the set of target URLs/IP addresses included in the offloading rule. The forwarding device is responsible for forwarding the data packet to a primary anchor UPF or a secondary anchor UPF. If the target URL/destination IP address of the detected uplink IP data packet is included in the set of target URLs/IP addresses included in the offloading rule, the forwarding device is responsible for forwarding the data packet to the primary anchor UPF via the N9 interface, otherwise, the forwarding device forwards the data packet to the secondary anchor UPF.

The following provides the specific process in which the 5G dual-domain private network implements service offloading based on the 5G dual-domain private network system in a domestic scenario and a foreign scenario, respectively.

In Scenario 1, the 5G dual-domain private network is used in the domestic scenario.

Figure 5A:
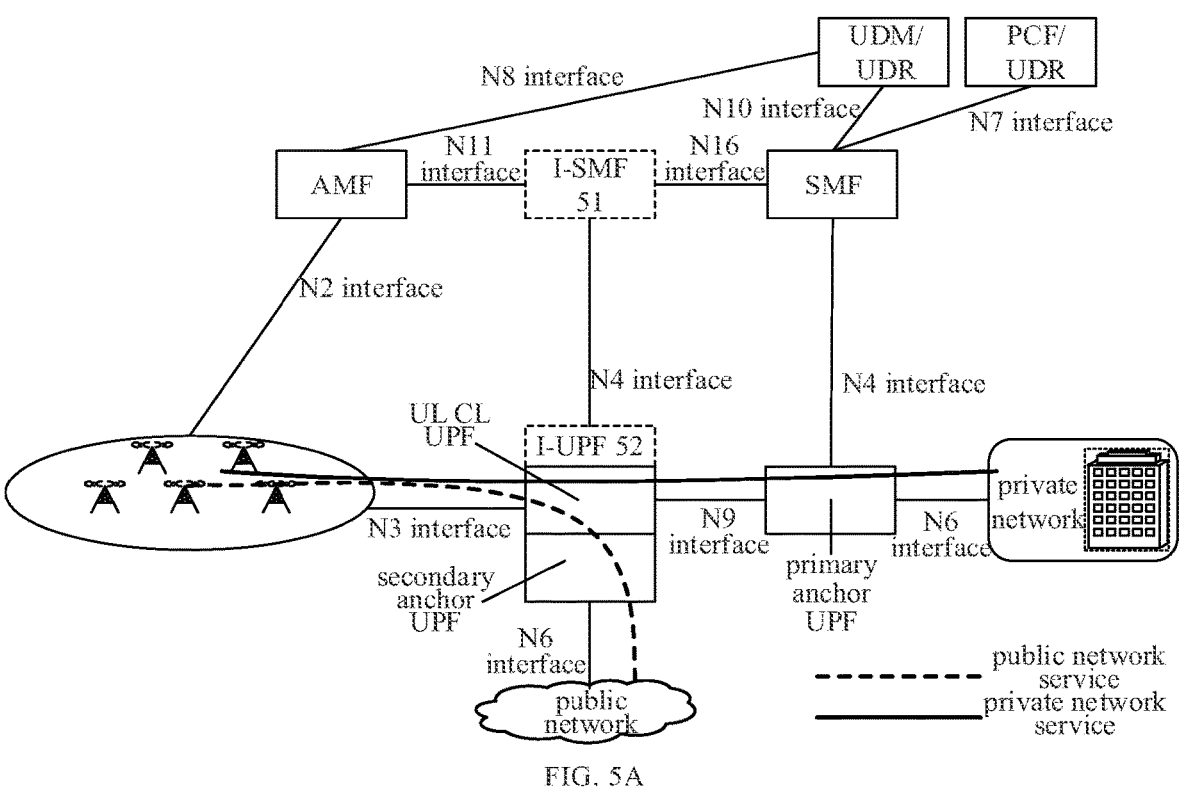
FIG. 5A is a schematic diagram of a networking scheme of a data offloading method in a non-international roaming scenario provided by an embodiment of the disclosure.

(1) A domestic AMF starts a DNN error correction function. During a process of establishing a PDU session of the terminal of the 5G dual-domain private network, regardless of which DNN is used by the terminal, the AMF corrects it to a subscribed dedicated DN. In a non-international roaming scenario, the AMF obtains the dedicated DNN subscribed by the user and a 5G dual-domain private network identifier from a UDM/UDR to which the user belongs, and determines a SMF of the session for the user via the dedicated DNN. The SMF determines a special-line UPF as a primary anchor UPF for the user based on the dedicated DNN. Meanwhile, the SMF obtains an offloading rule of the 5G dual-domain private network subscribed by the user from a PCF/UDR to which the user belongs, and, a UPF closest to the terminal is determined as the UL CL UPF according to a remote offloading identifier in the offloading rule, and the determined UL CL UPF is inserted into the PDU session of the user. As illustrated in FIG. 5A, the dashed line indicates the public network services, and the thick line indicates the private network services. If the user of the 5G dual-domain private network is in the domestic roaming scenario, there are I-SMF 51 and I-UPF 52 in the session. At this time, the I-SMF 51 determines the I-UPF 52 as the UL CL UPF and the secondary anchor UPF. After the SMF determines the UL CL UPF, the offloading rule of the 5G dual-domain private network is installed into the UL CL UPF. It should be noted that if the user is located within the service area (POOL) of the SMF, there is no I-SMF 51. If the user is out of the range of the service area of the SMF, the I-SMF is a SMF of the roaming area.

(2) During the establishment of the above PDU session, the primary anchor UPF assigns a first IP address to the terminal and sends the first IP address to the SMF through the N4 interface. The SMF requests the secondary anchor UPF to assign a second IP address to the terminal according to a special identifier of the user of the 5G dual-domain private network in the offloading rule, and the secondary anchor UPF sends the second IP address to the SMF through the N4 interface. At this time, the SMF binds the first IP address with the second IP address, and sends the second IP address in the "Namf_Communication_N1N2MessageTransfer" process to the AMF. The AMF sends the second IP address to the terminal in the "PDU Session Establishment Accept" process, and the terminal stores the second IP address as a source IP address of the terminal. Meanwhile, the SMF sends the first IP address and second IP address that are bound with each other to the UL CL UPF over the N4 interface, so that the UL CL UPF can save a binding relation between the first IP address and the second IP address and associates the binding relation with the PDU session. When the UL CL UPF detects that a destination IP address or a target URL of an uplink data packet of the PDU session of the terminal of the 5G dual-domain private network is included in the set of URs/destination IP addresses in the offloading rule, the source IP address of the uplink data packet is switched from the second IP address to the first IP address. If the UL CL UPF detects that the destination IP address or the target URL of the uplink data packet of the PDU session of the terminal of the 5G dual-domain private network is not included in the set of URLs/destination IP addresses in the offloading rule, after receiving a downlink data packet from the primary anchor UPF, the UL CL UPF switches the destination IP of the downlink data packet from the first IP address to the second IP address.

(3) After the establishment of the PDU session of the terminal is completed, the terminal starts to send and receive data. After the uplink data packet arrives at the UL CL UPF, the UL CL UPF checks the target URL or destination IP address of the uplink data packet according to a special identifier in the offloading rule of the dual-domain private network. If the target URL or destination IP address of the uplink data packet is included in the set of target URLs or destination IPs in the offloading rule, the source IP of the uplink data packet is switched from the second IP address to the first IP address, and the UL CL UPF offloads the uplink data packet to the primary anchor UPF (e.g., special-line UPF), so that the primary anchor UPF can send the data packet to the user private network. If the target URL or destination IP address of the uplink data packet is not included in the set of target URLs or destination IPs in the offloading rule, the UL CL UPF sends the uplink data packet to the secondary anchor UPF, and then the secondary anchor UPF sends it to the public network. When a downlink data packet from the primary anchor UPF arrives at the UL CL UPF, the UL CL UPF switches a destination IP of the downlink data packet from the first IP address to the second IP address. In this way, the user of the 5G dual-domain private network is supported to access private network services during domestic roaming, while realizing nearby offloading of accessing public network services, so as to avoid routing detours for public network services. On the other hand, when the terminal of the 5G dual-domain private network is roaming, the IP address of the terminal can be finely classified by the UPF of the roaming area in accordance with the districts and counties, so that the supervisory requirements can be satisfied.

In Scenario 2, the 5G dual-domain private network is used in the foreign scenario.

If the user of the 5G dual-domain private network roams abroad, in order to ensure that the user of the 5G dual-domain private network can use the public network services normally, the technical implementation scheme is provided as follows.

(1) When a home UDM/UDR of the user receives a "Nudm_SDM_Get" message from a foreign AMF during a terminal registration process. The home UDM/UDR determines whether the user is a user of the 5G dual-domain private network according to subscription information of the user, and determines whether it is an AMF of a foreign operator according to the MCC in a field name of the AMF. The home UDM/UDR provides the foreign AMF with only the general DNN (e.g., CMNET) subscribed by the user in the feedback message, but does not provide the subscribed dedicated DNN.

Figure 5B:
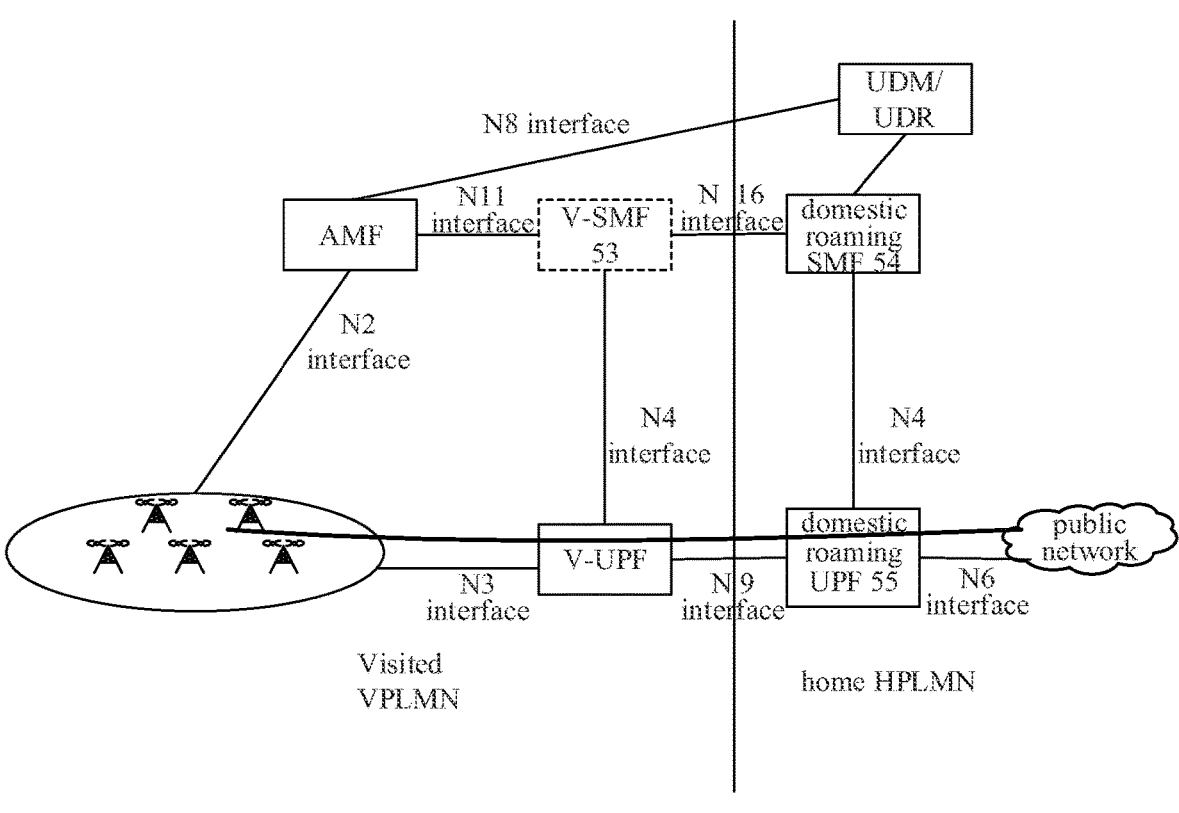
FIG. 5B is a schematic diagram of a networking scheme of a data offloading method in an international roaming scenario provided by an embodiment of the disclosure.

(2) The accessing AMF of the foreign roaming area determines a V-SMF according to the general DNN (e.g., CMNET) of the user of the 5G dual-domain private network in accordance with the 3GPP standard signaling process, and the V-SMF determines the V-UPF. As illustrated in FIG. 5B, the V-SMF 53 determines a domestic roaming SMF 54 of the home operator HPLMN as H-SMF according to the general DNN, the V-SMF 53 interacts signaling messages with the H-SMF, and the domestic roaming SMF 54 determines the domestic roaming UPF 55 according to the general DNN to establish the PDU session channel. After that, the user of the 5G dual-domain private network can access public network services normally.

The embodiment of the disclosure provides a 5G dual-domain private network service offloading method, which is based on dedicated DNN+UL CL technology. The technical advantages are provided as follows. On the one hand, the user of the 5G dual-domain private network can access the public network and the private network at anytime and anywhere during domestic roaming, and the public network traffic is channeled locally without going back to the special-line UPF of the area where the user belongs, to avoid detouring and roundabout of the public network traffic. On the other hand, the user of the 5G dual-domain private network can still access the public network services during international roaming. Meanwhile, it supports fine classification of the IP address when the user accesses public network services during domestic roaming, and the supervisory requirements are satisfied. In addition, it has no additional functional requirements for terminals, and it only requires that the terminals support a single DNN, and the terminal side is not perceptive.

It is noted that, in the embodiment of the disclosure, if the above-described data offloading method is implemented in the form of a software function module and is sold or used as a stand-alone product, it may also be stored in a computer-readable storage medium. Based on this understanding, the technical solutions of embodiments of the disclosure essentially or in part contributing to the related art may be embodied in the form of a software product. The software product is stored in a storage medium and includes a number of instructions to cause a computer device (which may be a personal computer, a server, or a network device, etc.) to perform all or part of the method described in the embodiments of the disclosure. The aforementioned storage medium includes a USB, a movable hard drive, a Read Only Memory (ROM), a magnetic disc or a compact disc, and other mediums that can store program codes. In this way, the embodiments of the disclosure are not limited to any particular hardware, software or firmware, or any combination of hardware, software and firmware.

The embodiments of the disclosure provide a computer device including a memory and a processor. The memory stores computer programs executable by the processor, and the processor implements some or all of the steps in the above method when executing the programs.

The embodiments of the disclosure provide a computer-readable storage medium having computer programs stored thereon. When the computer programs are executed by a processor, some or all of the steps in the method described above are implemented. The computer-readable storage medium may be transitory or non-transitory.

The embodiments of the disclosure provide a computer program including computer-readable codes. When the computer-readable codes are executed by a computer device, a processor in the computer device performs some or all of the steps in the method described above.

The embodiments of the disclosure provide a computer program product including a non-transitory computer-readable storage medium having computer programs stored thereon. When the computer programs are read and executed by a computer, some or all of the steps in the method described above are implemented. The computer program product may be implemented specifically by means of hardware, software or a combination thereof. In some embodiments, the computer program product is specifically embodied as a computer storage medium. In other embodiments, the computer program product is specifically embodied as a software product, such as a Software Development Kit (SDK) and the like.

It should be noted herein that the above description of the embodiments tends to emphasize differences between the embodiments, and similarities or likenesses thereof may be cross-referenced. The above description of embodiments of device, storage medium, computer program, and computer program product are similar to the above description of the method embodiments and have similar beneficial effects as the method embodiments. Technical details not disclosed in the presently disclosed embodiments of device, storage medium, computer program, and computer program product, can be referred to the description of the presently disclosed method embodiments for understanding.

Figure 6:
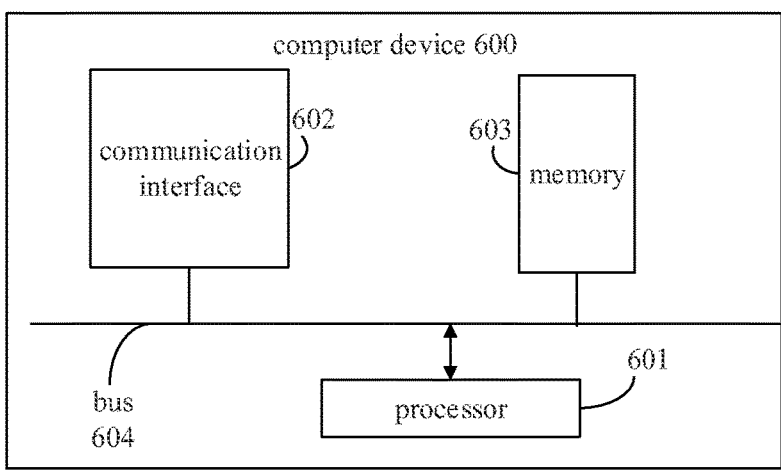
FIG. 6 is a schematic diagram of a hardware entity of a computer device provided by an embodiment of the disclosure.

It is noted that FIG. 6 is a schematic diagram of a hardware entity of a computer device provided by an embodiment of the disclosure. As illustrated in FIG. 6, the hardware entity of the computer device 600 includes: a processor 601, a communication interface 602, and a memory 603.

The processor 601 typically controls the overall operation of the computer device 600.

The communication interface 602 may enable the computer device to communicate with other terminals or servers over a network.

The memory 603 is configured to store instructions and applications executable by the processor 601, and it may also cache data (e.g., image data, audio data, voice communication data, and video communication data) to be processed or that has already processed by the processor 601 or by modules in the computer device 600, which may be implemented via a flash memory (FLASH) or a random-access memory (RAM). Data can be transferred among the processor 601, the communication interface 602, and the memory 603 via a bus 604.

It should be understood that references to "an embodiment" or "the embodiment" throughout the specification mean that a particular feature, structure, or characteristic associated with the embodiment is included in at least one embodiment of the disclosure. Therefore, "in an embodiment" or "in the embodiment" appearing at various places throughout the specification may not necessarily refer to the same embodiment. Moreover, these particular features, structures, or characteristics may be combined in one or more embodiments in any suitable manner. It should be understood that in various embodiments of the disclosure, the amplitude of the serial numbers of the above steps/processes does not imply the order of execution, and the order of execution of the steps/processes should be determined by their functions and internal logic, and should not constitute any limitation on the implementation process of the embodiments of the disclosure. The above serial numbers of the embodiments of the disclosure are for descriptive purpose only and do not represent the advantages or disadvantages of the embodiments.

It should be noted that, as used herein, the terms "including", "comprising", or any other variant thereof, are intended to cover non-exclusive inclusion, such that a process, method, article, or apparatus comprising a set of elements includes not only those elements, but also other elements that are not expressly listed, or elements that are inherent to such process, method, article or device. Without further limitation, the fact that an element is defined by the phrase "includes a . . . " does not preclude the existence of another identical element in the process, method, article or apparatus that includes that element.

In the several embodiments provided in the disclosure, it should be understood that the devices and methods disclosed above can be implemented in other ways. The device embodiments described above are merely schematic. The units described above can be classified by logical functions, and they can also be classified in other ways during actual implementation. For example, multiple units or components may be combined or integrated into another system, or some features may be ignored or not implemented. In addition, the components shown or discussed herein can be coupled, direct coupled, or communicatively connected to each other through some interfaces. Indirect coupling or communication connection between devices or units may be electrical, mechanical or otherwise.

The units illustrated above as separated components may or may not be physically separated. The components shown as units may or may not be physical units, and they may be located in a single place or may be distributed over a plurality of network units. Some or all of these units may be determined to fulfil the purpose of the solution of embodiments according to practical needs.

In addition, each functional unit in the embodiment of the disclosure may be fully integrated in a single processing unit or may be separated as a single unit, or two or more units may be integrated in one unit. The above integrated units may be implemented either in the form of hardware or in the form of a combination of hardware and software functional units.

Those skilled in the art may understand that: all or some of the steps of implementing the above method embodiments may be accomplished by hardware associated with the program instructions. The foregoing program may be stored in a computer-readable storage medium. When the program is executed, the steps including the above method embodiments are implemented. The above storage medium includes: a mobile storage device, a ROM, a magnetic disc or compact disc, and other kinds of mediums that can store the program codes.

Alternatively, the integrated units described above in the disclosure may be stored in a computer-readable storage medium if implemented as software function modules and sold or used as stand-alone products. Based on this understanding, the technical solutions of the disclosure essentially or in part contributing to the related art may be embodied in the form of a software product. The software product is stored in a storage medium and includes a number of instructions to cause a computer device (which may be a personal computer, a server, or a network device, etc.) to perform all or part of the method described in the embodiments of the disclosure. The aforementioned storage medium includes a movable hard drive, a ROM, a magnetic disc or a compact disc, and other mediums that can store program codes.

The foregoing includes only implementations of the disclosure, but the scope of protection of the disclosure is not limited thereto, and those skilled in the art who is familiar with the technical field can readily think of changes or substitutions within the technical scope of the disclosure that should be covered by the scope of protection of the disclosure.

What is claimed is:

1. A data offloading method, performed by an uplink classifier (UL CL) user plane function (UPF) network element in a dual-domain private network system, wherein the dual-domain private network system further comprises a session management function (SMF) network element, a policy control function (PCF) network element for subscribing an offloading rule for a target user, a unified data management (UDM) network element for subscribing a dedicated data network name (DNN) and a general DNN for the target user, and the method comprises:

in response to receiving an uplink data packet sent by the target user in a non-international roaming scenario, detecting whether the uplink data packet matches at least one of a set of target uniform resource locators (URL) or a set of destination internet protocol (IP) addresses included in the offloading rule, wherein the offloading rule is configured by the SMF network element when the SMF network element inserts the UL CL UPF network element during establishing a packet data unit (PDU) session, wherein the PDU session is established based on the dedicated DNN;

in response to the uplink data packet matching the at least one of the set of target or the set of destination IP addresses included in the offloading rule, forwarding the uplink data packet to a primary anchor UPF network element to access a user private network, wherein the primary anchor UPF network element is determined based on the dedicated DNN; and in response to the uplink data packet not matching any of the set of target or the set of destination IP addresses included in the offloading rule, forwarding the uplink data packet to a secondary anchor UPF network element to access a public network, wherein the secondary anchor UPF network element is determined based on the general DNN.

2. The method of claim 1, wherein a UPF network element that is closest to a terminal is determined as the UL CL UPF network element by the SMF network element based on the general DNN and a location of the target user, and the UL CL UPF network element serves as the secondary anchor UPF network element.

3. The method of claim 1, wherein during establishing the PDU session, the method further comprises:

receiving a binding relation between a first IP address and a second IP address sent by the SMF network element, wherein the first IP address is assigned by the primary anchor UPF network element for a user terminal corresponding to the target user, and the second IP address is assigned by the secondary anchor UPF network element for the user terminal in response to a request from the SMF network element; and associating the binding relation to the PDU session;

wherein, before forwarding the uplink data packet to the primary anchor UPF network element, further comprising:

switching a source IP address of the uplink data packet from the second IP address to the first IP address based on the binding relation.

4. The method of claim 3, after receiving a downlink data packet sent by the primary anchor UPF network element, further comprising:

switching a destination IP address of the downlink data packet from the first IP address to the second IP address based on the binding relation; and forwarding the downlink data packet with the destination IP address to the user terminal via an access and mobility management function (AMF) network element.

5. A data offloading method, performed by a session management function (SMF) network element in a dual-domain private network system, wherein the dual-domain private network system comprises an uplink classifier (UL CL) user plane function (UPF) network element, a policy control function (PCF) network element for subscribing an offloading rule for a target user, a unified data management (UDM) network element for subscribing a dedicated data network name (DNN) and a general DNN for the target user, and the method comprises:

receiving the offloading rule subscribed by the target user from the PCF network element, wherein the offloading rule comprises a remote offloading identifier, and the remote offloading identifier is configured to indicate the SMF network element to insert the UL CL UPF network element while establishing a PDU session for the target user; and inserting the UL CL UPF network element while establishing the PDU session based on the remote offloading identifier, wherein the PDU session is established using the dedicated DNN.

6. The method of claim 5, wherein inserting the UL CL UPF network element while establishing the PDU session based on the remote offloading identifier, comprises:

determining a UPF network element that is closest to a terminal as the UL CL UPF network element using the general DNN based on the remote offloading identifier;

configuring the offloading rule for the UL CL UPF network element; and inserting the UL CL UPF network element while establishing the PDU session.

7. The method of claim 5, wherein while establishing the PDU session, the method further comprises:

receiving a first IP address assigned by a primary anchor UPF network element for a user terminal of the target user, wherein the primary anchor UPF network element is determined based on the dedicated DNN;

sending an IP address request to a secondary anchor UPF network element based on the remote offloading identifier in the offloading rule, wherein the secondary anchor UPF network element is determined based on the general DNN;

receiving a second IP address assigned by the secondary anchor UPF network element for the user terminal, and sending the second IP address to the user terminal; and binding the first IP address with the second IP address, and sending a binding relation to the UL CL UPF network element.

8. The method of claim 5, wherein when the target user is in a domestic roaming scenario, the PDU session further comprises an I-SMF network element and an I-UPF network element, and the method further comprises:

connecting the SMF network element to the I-SMF network element, and determining the I-UPF network element as the UL CL UPF network element via the I-SMF network element.

9. A computer device, comprising a memory and a processor, wherein the memory has a computer program runnable on the processor stored thereon, and the processor is configured to:

in response to receiving an uplink data packet sent by the target user in a non-international roaming scenario, detect whether the uplink data packet matches at least one of a set of target uniform resource locators (URL) or a set of destination internet protocol (IP) addresses included in the offloading rule, wherein the offloading rule is configured by the SMF network element when the SMF network element inserts the UL CL UPF network element during establishing a packet data unit (PDU) session, wherein the PDU session is established based on the dedicated DNN;

in response to the uplink data packet matching the at least one of the set of target or the set of destination IP addresses included in the offloading rule, forward the uplink data packet to a primary anchor UPF network element to access a user private network, wherein the primary anchor UPF network element is determined based on the dedicated DNN; and in response to the uplink data packet not matching any of the set of target or the set of destination IP addresses included in the offloading rule, forward the uplink data packet to a secondary anchor UPF network element to access a public network, wherein the secondary anchor UPF network element is determined based on the general DNN.

10. The method of claim 6, wherein while establishing the PDU session, the method further comprises:

receiving a first IP address assigned by a primary anchor UPF network element for a user terminal of the target user, wherein the primary anchor UPF network element is determined based on the dedicated DNN;

sending an IP address request to a secondary anchor UPF network element based on the remote offloading identifier in the offloading rule, wherein the secondary anchor UPF network element is determined based on the general DNN;

receiving a second IP address assigned by the secondary anchor UPF network element for the user terminal, and sending the second IP address to the user terminal; and binding the first IP address with the second IP address, and sending a binding relation to the UL CL UPF network element.

11. The method of claim 6, wherein when the target user is in a domestic roaming scenario, the PDU session further comprises an I-SMF network element and an I-UPF network element, and the method further comprises:

connecting the SMF network element to the I-SMF network element, and determining the I-UPF network element as the UL CL UPF network element via the I-SMF network element.

12. The computer device of claim 9, wherein a UPF network element that is closest to a terminal is determined as the UL CL UPF network element by the SMF network element based on the general DNN and a location of the target user, and the UL CL UPF network element serves as the secondary anchor UPF network element.

13. The computer device of claim 9, wherein during establishing the PDU session, the processor is configured to:

receive a binding relation between a first IP address and a second IP address sent by the SMF network element, wherein the first IP address is assigned by the primary anchor UPF network element for a user terminal corresponding to the target user, and the second IP address is assigned by the secondary anchor UPF network element for the user terminal in response to a request from the SMF network element; and associate the binding relation to the PDU session;

wherein, before forwarding the uplink data packet to the primary anchor UPF network element, the processor is configured to:

switch a source IP address of the uplink data packet from the second IP address to the first IP address based on the binding relation.

14. The computer device of claim 13, after receiving a downlink data packet sent by the primary anchor UPF network element, the processor is configured to:

switch a destination IP address of the downlink data packet from the first IP address to the second IP address based on the binding relation; and forward the downlink data packet with the destination IP address to the user terminal via an access and mobility management function (AMF) network element.

15. A computer device, comprising a memory and a processor, wherein has a computer program runnable on the processor stored thereon, and the processor is configured to perform the method of claim 5.

* * * * *